United States Patent [19]
Swinson

[11] 3,790,285
[45] Feb. 5, 1974

[54] SCATTERED LIGHT POLARISCOPE

[75] Inventor: Weldon F. Swinson, Auburn, Ala.

[73] Assignee: Harmon White & Associates, Inc., Opelika, Ala.

[22] Filed: July 19, 1971

[21] Appl. No.: 163,744

[52] U.S. Cl.................................. 356/115, 356/33
[51] Int. Cl............................................. G01r 21/40
[58] Field of Search................. 356/115, 32, 33, 34

[56] References Cited
UNITED STATES PATENTS
3,373,652  3/1968  Flader........................... 356/115 X
3,177,761  4/1965  Redner............................ 356/115
FOREIGN PATENTS OR APPLICATIONS
1,102,617  5/1955  France............................. 356/115

OTHER PUBLICATIONS
"Scattered Light ... Stress Analysis," 35 Review of Scientific Instruments 976–977.

Primary Examiner—Ronald L. Wibert
Assistant Examiner—Conrad Clark
Attorney, Agent, or Firm—Clarence A. O'Brien; Harvey B. Jacobson

[57] ABSTRACT

A photoelastic model is fixedly positioned in a body of fluid within an octagonal tank. The planar sides of the tank are provided with windows and the tank is supported for angular movement about a vertical axis relative to the model until desired fringe patterns are visible through one or more of the windows. Laser or polarized light beams scattered or transmitted by the model produce the fringe patterns for analysis of the model under different operational modes.

10 Claims, 6 Drawing Figures

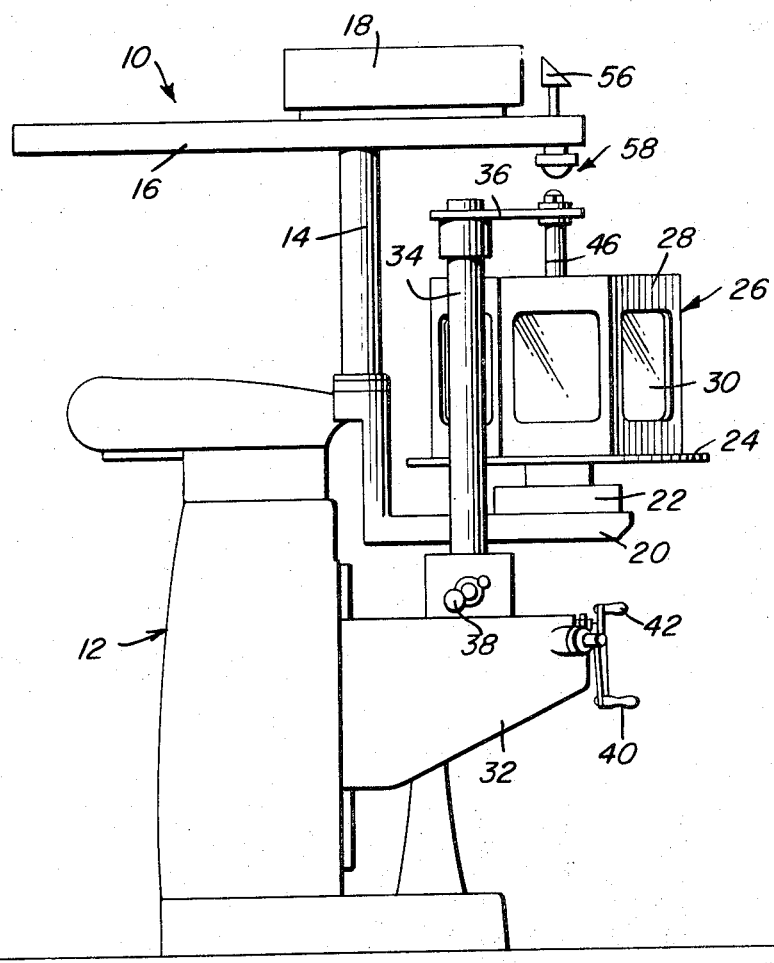
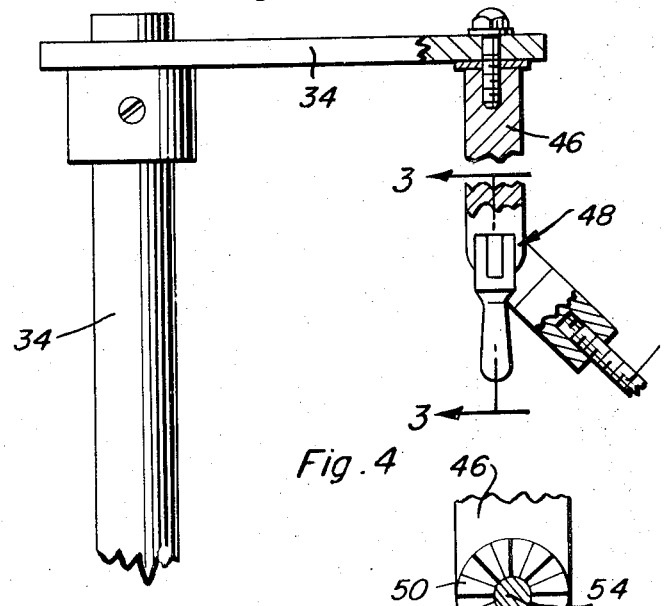
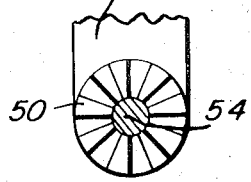

Weldon F. Swinson
INVENTOR.

SCATTERED LIGHT POLARISCOPE

This invention relates to the experimental determination of stresses in materials by analysis of fringe patterns produced as a result of the passing of a light beam through a model made of birefringent material.

Apparatus and methods for the analysis of stresses produced in a photoelastic model by means of its birefringent characteristics are well known. Apparatus of this type generally referred to as polariscopes, are disclosed for example in U. S. Pat. Nos. 3,177,761 and 3,373,652 to Redner and Flader respectively. Such prior art polariscopes, are however, limited in use and involve a considerable amount of structural complexity in connection with the loading and positioning of the photoelastic model. It is therefore an important object of the present invention to provide a polariscope capable of being utilized in different operational modes including use for three dimensional stress analysis as a scattered light polariscope and plane stress analysis as a transmission polariscope or an oblique incidence polariscope. Further, the polariscope of the present invention simplifies the loading and positioning of the model relative to the source of light and a recording camera.

In accordance with the present invention, a loaded, photoelastic model is adjusted to a fixed position relative to the frame of the machine so as to be exposed to a light beam which may either originate from a laser generator or a fluorescent source of light. The model when so positioned, is suspended within a body of fluid enclosed within an octagonal tank adapted to be rotated about a vertical axis in order to present the planar viewing windows on the vertical sides of the tank to one or more viewing locations externally of the tank. By angularly adjusting the position of the tank relative to the fixedly positioned model, the fringe pattern produced within the model may be viewed or its image recorded. When utilizing the laser generator as the source of polarized light, the beam passes through a quarter wave length plate and compensator for conditioning the polarizing vector in order to produce a distinct fringe pattern visible along a line of observation in a plane perpendicular to the impinging scattered light beam and located 45° from the stress axis of the model along which a camera may be positioned. Accordingly, an image of the fringe pattern may be recorded along the principal stress axis intersecting one of the windows in the tank when the tank is rotated to a position at which maximum fringe pattern density is observed through an adjacent tank window 45° from the stress axis.

The apparatus may be utilized as a transmission polariscope for two dimensional models by establishing a source of light impinging on and transmitted through the model in a plane perpendicular to the rotational axis of the tank. The light beam enters the tank through one of the windows in axial alignment with the line of observation through two sets of polarizing plates and one-quarter wave length plates. The stress plane in the model being investigated, will be vertical and at an angle to the transmitted light. This angle will be normal for obtaining the usual photoelastic information and at a predetermined angle for oblique incidence work.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view illustrating a typical polariscope constructed in accordance with the present invention.

FIG. 2 is an enlarged partial side elevational view with portions shown in section.

FIG. 3 is a partial sectional view taken substantially through a plane indicated by section line 3—3 in FIG. 2.

FIG. 4 is a partial sectional view taken substantially through a plane indicated by section line 4—4 in FIG. 3.

Figure 5:
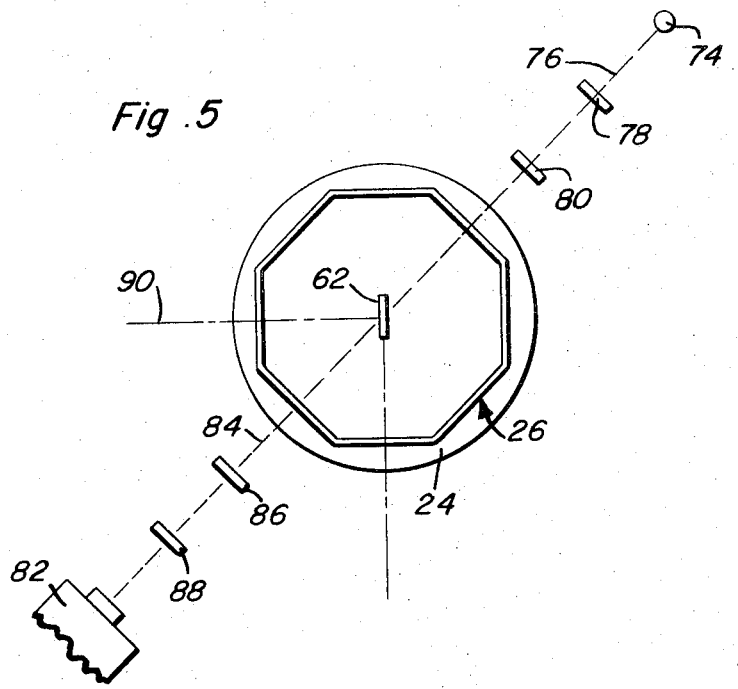
FIG. 5 is a schematic top plane view illustrating the operational principles of the polariscope.

The polariscope as illustrated in FIG. 1 is generally referred to by reference numeral 10 and includes a machine frame generally referred to by reference numeral 12. A vertically adjusted standard 14 extends upwardly from the machine frame and mounts on top thereof, a support 16 for a laser beam generator 18. A support 20 also extends laterally from the machine frame on which a rotatable indexing head 22 is mounted. The indexing head supports a table 24 on which a fluid enclosing tank 26 is mounted. The tank is accordingly mounted for angular adjustment about a vertical axis and is octagonal in cross-sectional shape perpendicular to the vertical axis. The vertical planar sides 28 of the tank are provided with glass windows 30 through which fringe patterns may be observed as will be hereafter explained.

Also extending laterally from the machine frame 12, is a positioning block 32 from which a model support post 34 extends upwardly. Secured to the upper end of the support post, is a horizontal support arm 36. The model is adapted to be suspended from the support arm 36 within the tank 26 immersed in a body of fluid. The position of the model is angularly indexed about the vertical axis of the post 34 through an indexing mechanism well known to persons skilled in the art, operated by means of an indexing control 38. The positioning block 32 and the positioning mechanism enclosed therein also accommodate adjustments in other directions including the raising and lowering of the model through control 40 and horizontal positioning through control 42.

As more clearly seen in FIGS. 2, 3 and 4, additional adjustments are provided for positioning the model adapted to be attached to an extensible arm 44 which is pivotally connected to a support member 46 depending from the horizontal support arm 34. The angular position of the extensible arm 44 relative to the support member 46 may be adjusted and locked in adjusted position by means of the lock mechanism 48. The lock mechanism may include by way of example, ratchet teeth 50 carried by the arm 44 for engagement by teeth on the clevis formation 52 at the lower end of the support 46. The support member 46 and the extensible arm 44 are pinned to each other by a pivot shaft 54.

A model holder is made up separately for each type of model in a manner well known to those skilled in the art so that proper model loading can be accomplished. The model and holder is then clamped to the extensible arm 44 whereby the loaded model may be adjustably positioned at a fixed location within the tank 26. Since the particular model and model holder utilized may vary and since the details thereof form no part of the present invention, they are not specifically illustrated in the drawings. A model and model holder adapted to be positioned in operative relation to a polariscope is shown for example in U. S. Pat. No. 3,373,652 to Flader, aforementioned. The model, of course, corresponds to a component part under study and can be as large as necessary. Best results are, however, obtained with models occupying less than one cubic foot of volume. By clamping the model holder to the extensible arm 44, the model will be easily accessible prior to its immersion in an oil bath or a fluid enclosed by the octagonal tank 26. The oil bath serves as a medium for suspension of the model as well as to provide desirable characteristics to an impinging light beam. The fringe patterns produced as a result of the exposure of the model to the light beam, are visible from a plurality of locations through the windows 30 of the tank which are spaced 45° to each other. Thus, simultaneous inspection of the fringe patterns from different directions is possible and rotation of the tank about a vertical axis allows movement of the observation point while the model remains stationary. The plate glass windows 30 also aid in photographing the model from the desired angle. The size and frequency of the fringe lines in the fringe pattern are used to determine the magnitudes of the stresses in the material under investigation as is well known.

The light beam impinging on the model may be derived from the laser generator 18 positioned with its axis aligned with a reflecting prism 56. The laser beam is accordingly reflected downwardly through an optical assembly generally referred to by reference numeral 58 conditioning the light for producing the desired fringe patterns when impinging on the model alinged therebelow within the oil bath enclosed by the tank 26.

Figure 6:
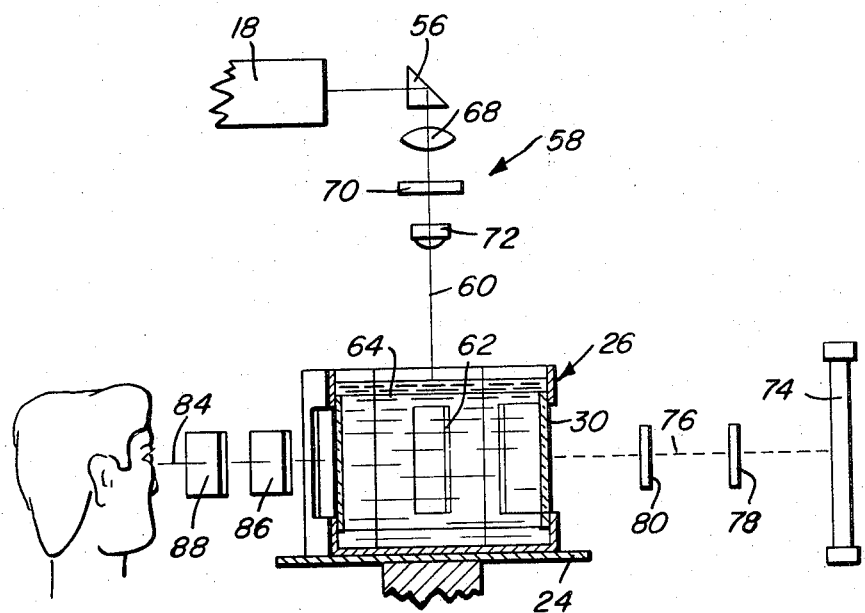
FIG. 6 is a schematic side sectional view with portions shown in section illustrating the operating principles of the polariscope.

The polariscope 10 may be used for three dimensional stress analysis as a scattered light polariscope when the light beam is derived from the laser generator 18. As schematically shown in FIG. 6, the laser beam emerging from the generator 18 is reflected 90° downwardly along an optical axis 60 for impingement with the model 62 held stationary in an adjustably fixed position within the oil bath 64 enclosed by the tank 26. Fringe patterns produced as a result, may then be viewed along a line of observation 84, for example, in a plane perpendicular to the optical axis 60 of the light beam through one of the light transmissive windows 30. The light beam is conditioned by passage through a lens 68 associated with the optical assembly 58 and a quarter wave length plate 70 as well as a compensator 72. The fringe patterns resulting from the foregoing light scattering arrangement, produce a fringe pattern having a maximum density in the observation plane perpendicular to the optical axis 60 which is 45° away from the stress axes of the model 62 as is well known by persons skilled in the art. The octagonal arrangement of the tank takes advantage of this phenomena in order to enable angular adjustment of the tank until maximum fringe pattern density is observed through one window immediately adjacent to a window spaced 45° therefrom along the stress axes with which a camera may be aligned for recording the fringe pattern image. Thus, the arrangement of the present invention allows simultaneous location of the stress axes and observation of the desired fringe pattern data. Further, since the model is stationary relative to the rotatable tank, a greater variation in loadings of the model can be applied both static and dynamic. Also, critical alignment of the laser beam with respect to a specific point of interest on the model may be more easily obtained and maintained.

FIGS. 5 and 6 schematically show use of the polariscope for plane stress analysis both as a transmission and an oblique incidence polariscope. When utilizing the polariscope for the most common plane stress work, the light beam impinging on the model is derived from a source of light such as a fluorescent lamp 74 from which the light beam emerges along an optical axis 76 impinging on a stress plane perpendicular thereto. The light beam is conditioned by passage through a polarizing plate 78 and a quarter wave length plate 80 prior to impinging on the model. The fringe patterns so produced may then be viewed by eye or recorded by a camera 82 along a line of observation 84. A quarter wave length plate 86 and an analyzing or polarizing plate 88 is, however, positioned between the model and the camera as diagrammatically shown in FIG. 5 in accordance with practice well known to those skilled in the art. In FIG. 5, the line of observation 84 is at an angle $\phi$ to the model stress plane for an oblique incidence operational mode. Use of the polariscope as a more common transmission polariscope is also possible by obtaining fringe pattern data along a line of observation 90 as shown in FIG. 5 when $\phi$ equals zero.

The components aforementioned in connection with use of the polariscope as a transmission or oblique incidence polariscope, may be suitably mounted as attachments to the supporting table 24 of the octagonal tank 26. Thus, the polariscope may be utilized in several operational modes either separately or simultaneously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a method of analyzing a photoelastic model under load having birefringent characteristics including the steps of: exposing the model immersed within a body of fluid to a light beam producing a fringe pattern viewed along a line of observation perpendicular to the light beam; fixedly positioning the model with the light beam impinging thereon; enclosing the model within an enclosure having a plurality of light transmissive faces substantially parallel to said light beam and at external angles of 45° between adjacent faces; confining said body of fluid within the enclosure; and angularly adjusting the position of the enclosure relative to the fixedly positioned model until desired fringe pattern data is observed through one of the faces along said line of observation.

2. The method of claim 1 wherein said enclosure is angularly adjusted about a rotational axis parallel to the beam of light.

3. The method of claim 2 wherein said line of observation corresponds to the location of maximum fringe pattern density.

4. The method of claim 3 including the step of:
recording an image of the fringe pattern visible through another of said faces of the enclosure adjacent to said one of the faces intersected by the line of observation.

5. The method of claim 1 wherein said line of observation corresponds to the location of maximum fringe pattern density.

6. The method of claim 1 including the step of:
recording an image of the fringe pattern visible through another of said faces of the enclosure adjacent to said one of the faces intersected by the line of observation.

7. The method of claim 1 including the step of transmitting light through the model along an optical axis in a plane common to the line of observation and perpendicular to the plane of stress being examined.

8. The method of claim 7 wherein said line of observation is aligned at a predetermined angle to the plane of stress.

9. Apparatus for analyzing a photoelastic model under load having birefringent characteristics when exposed to a light beam, comprising means for fixedly positioning said model, a source of light scattered by said fixedly positioned model, an enclosure containing a body of fluid having an index of refraction compatible with that of the model, means for supporting the enclosure with the fixedly positioned model suspended within the body of fluid to produce scattered light fringe patterns, light transmissive means having planar faces mounted by the enclosure for viewing the fringe patterns from a plurality of angularly spaced locations, means for angularly adjusting the enclosure relative to the fixedly positioned model, means transmitting the light beam from the source to the model along an axis parallel to said faces for producing a maximum fringe pattern density visible through one of said planar faces at one of said angularly spaced locations 45° from the other of the locations on the principal stress axis of the model.

10. The combination of claim 9 including camera means for recording an image of the fringe pattern at said other of the locations.

* * * * *